US009372671B2

(12) United States Patent
Balan et al.

(10) Patent No.: US 9,372,671 B2
(45) Date of Patent: Jun. 21, 2016

(54) MODELING AND CODE GENERATION FOR SQL-BASED DATA TRANSFORMATIONS

(75) Inventors: Ajay N. Balan, Highlands Ranch, CO (US); Randall L. Hughes, Centennial, CO (US); Michael Doucette, Aurora, CO (US); Lisa Doucette, legal representative, Aurora, CO (US)

(73) Assignee: SYBASE, INC., Dublin, CA (US)

( * ) Notice: Subject to any disclaimer, the term of this patent is extended or adjusted under 35 U.S.C. 154(b) by 522 days.

(21) Appl. No.: 13/221,408

(22) Filed: Aug. 30, 2011

(65) Prior Publication Data
US 2013/0055197 A1    Feb. 28, 2013

(51) Int. Cl.
*G06F 9/45*    (2006.01)
*G06F 9/44*    (2006.01)

(52) U.S. Cl.
CPC .. *G06F 8/30* (2013.01); *G06F 8/34* (2013.01); *G06F 8/447* (2013.01)

(58) Field of Classification Search
None
See application file for complete search history.

(56) References Cited

U.S. PATENT DOCUMENTS

| | | | |
|---|---|---|---|
| 5,642,504 A * | 6/1997 | Shiga | |
| 5,699,310 A * | 12/1997 | Garloff et al. | 717/108 |
| 6,668,253 B1 * | 12/2003 | Thompson et al. | |
| 2002/0092004 A1 * | 7/2002 | Lee et al. | 717/140 |
| 2005/0028143 A1 * | 2/2005 | Aridor | G06F 8/71 717/122 |
| 2005/0149537 A1 * | 7/2005 | Balin et al. | 707/100 |
| 2008/0028383 A1 * | 1/2008 | Archambault et al. | 717/157 |
| 2008/0109715 A1 * | 5/2008 | Stover | 715/237 |
| 2008/0189679 A1 * | 8/2008 | Rodriguez et al. | 717/105 |
| 2010/0083212 A1 * | 4/2010 | Fritzsche et al. | 717/104 |
| 2012/0102472 A1 * | 4/2012 | Wu | G06F 8/434 717/137 |

OTHER PUBLICATIONS

Bhatt et al., "An XML-based framework for bidirectional transformation in model-driven architecture (MDA)." ACM SIGSOFT Software Engineering Notes 34.3 (2009): pp. 1-5.*
Vara et al. "Model transformation for object-relational database development." Proceedings of the 2007 ACM symposium on Applied computing. ACM, 2007.*

* cited by examiner

*Primary Examiner* — Chameli Das
*Assistant Examiner* — Joanne Macasiano
(74) *Attorney, Agent, or Firm* — Sterne, Kessler, Goldstein & Fox P.L.L.C.

(57) ABSTRACT

System, method and computer program product for modeling and code generation for SQL-based data transformations. A selection, by a user, of a component to include in a visual representation of a data transformation model (DTM) is received. Logic corresponding to the selected component is arranged in the DTM, wherein the selected component and the logic are compatible with a plurality of implementations of SQL. SQL code corresponding to the logic is generated, wherein the generated SQL code is specific to a selected one of the plurality of SQL implementations. Responsive to the selection, the generated SQL code is provided for rendering in association with the visual representation of the DTM including the selected component.

24 Claims, 6 Drawing Sheets

MODELING AND CODE GENERATION FOR SQL-BASED DATA TRANSFORMATIONS

BACKGROUND

1. Field of the Invention

Embodiments relate generally to modeling SQL-based data transformations.

2. Background

SQL (structured query language) is a computer language commonly used to manage data in database management systems (DBMSs). With the growth in popularity and usage of DBMSs, SQL has also grown in popularity. Database vendors and other programmers, seeking greater functionality and customization from SQL by which they can better manage their data, have introduced a variety of new SQL implementations, whereby the various SQL implementations may include not only features that vary from one implementation to the next, but also features that are common amongst several or all of the implementations but may be implemented differently in different implementations. As a result, data management in a DBMS often requires specific knowledge of not only the data being managed, but also which SQL implementation is being used on the DBMS, specific details as to which features are available within the implemented SQL and how those features are implemented.

As part of its data management capability, SQL may be used to perform data transformations, whereby data is converted from a source data format into destination data or a destination data format across one or more databases or DBMSs. A data transformation often takes place in two steps, a data mapping step during which data elements from a source are mapped to a target destination, and a code generation step during which code to perform the data transformation is written.

Designing and performing data transformations in and/or amongst DBMSs becomes difficult however, because, as just referenced, even if data is being transferred within a system that shares the same SQL implementation on both the source data and the target destination, specific knowledge of which features are available and how they are implemented is required to successfully design and perform any data transformation. Further, the tasks of designing and performing a data transformation become even more difficult if the specific SQL implementation being used on a system is not known.

BRIEF SUMMARY OF THE INVENTION

Embodiments of the invention include systems, methods and computer program products for modeling and generating code for SQL-based data transformations. A model may receive a selected component to include in a visual representation of a data transformation model (DTM). A model builder may arrange logic corresponding to the selected component in the DTM, which may be compatible across SQL implementations. A code generator may generate SQL code specific to a selected SQL implementations. The model viewer may provide the generated SQL code.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
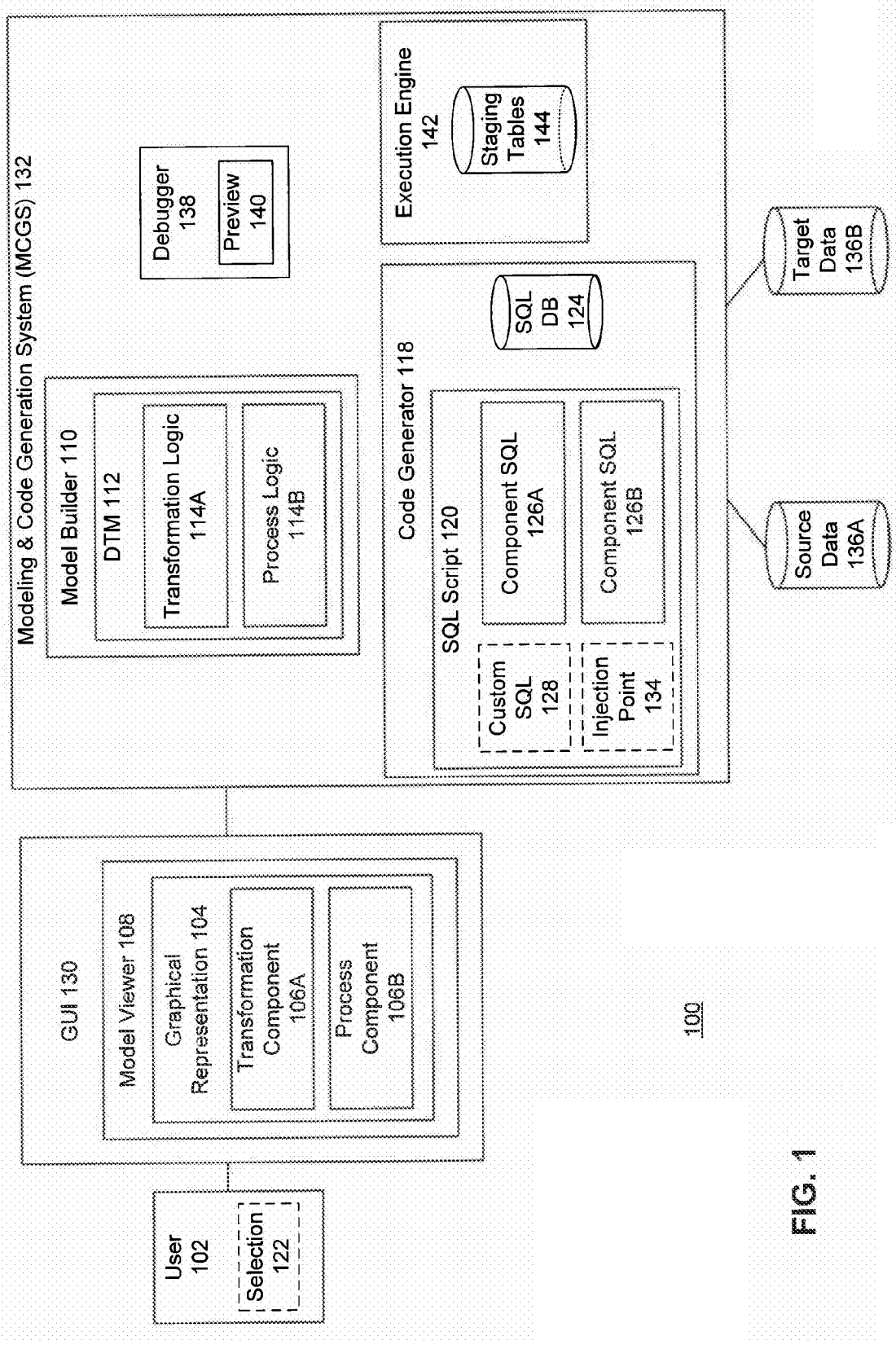
FIG. 1 is a block diagram of an SQL-based modeling and code generation system, according to an example embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of an SQL-based modeling and code generation system 100, according to an example embodiment. It is noted that embodiments of the invention are discussed for use with SQL, but it should be understood that other embodiments of the invention are further applicable to other database management languages.

SQL (structured query language) is often used in designing and/or managing data in database management systems (DBMSs). Over time, various vendors have introduced functionality to improve, add, and/or refine features of SQL, resulting in numerous and often varying implementations of SQL, many of which include additional and/or differing functionality that may not be included in other implementations. As a result, a first SQL implementation may include functionality and/or expressions that are absent or different in a second SQL implementation, and vice versa.

However, just as varying implementations of SQL may include functionality that differs, so, too, may they include functionality that is similar or universal amongst varying SQL implementations. Even though in some cases this universal functionality may be implemented differently across varying SQL implementations, as will be described, the universal functionality may be expressed as one or more SQL-neutral expressions when designing a data transformation within system 100. Through its usage of SQL-neutral components, expressions and universal SQL functionality, system 100 may allow for complex processing and logic to be used in graphically-designed data transformation(s).

System 100 allows a user 102 to build a graphical representation 104 for one or more data transformations, using universal SQL functionality (e.g., functionality that is available across two or more SQL implementations) expressed in SQL-neutral expressions and/or custom SQL code as provided by user 102. System 100 may then and/or simultaneously generate a data transformation model (DTM) 112 corresponding to graphical representation 104 designed by user 102, whereby both graphical representation 104 and DTM 112 may be expressed using SQL-neutral expressions and/or dialect (hereinafter referred to as SQL-neutral expressions). The SQL-neutral expressions may include expressions that are common in SQL, but are not necessarily specific to any one particular SQL implementation, and represent universal SQL functionality.

Thus, system 100 may allow users 102 to design data transformations for multiple and/or varied SQL implementations with or without prior knowledge of which SQL implementation(s) will be used with the designed data transformation(s). This may allow users to specialize in, and/or focus efforts on, the efficient design and/or construction of the data transformations without being hindered by the details of which functionality is compatible with which SQL implementations and how that functionality is implemented.

A data transformation may include any process that manipulates data. Example data transformation processes may include, but are not limited to, modifying data, sorting data, counting data, filtering data, converting data from one type to another (e.g., integer to decimal), copying data, adding data, combining data, and removing data. Data transformations may be useful in any number of different situations, such as when data is to be moved from one table to another or when data is to be reorganized (e.g., into different tables and/or columns). A data transformation designed within system 100 may include any number of data transformations and/or processes as part of its functionality. An example data transformation designed within system 100 may, from a collection of source data, extract only those records or transactions that occurred within a particular time range, modify the textual characters describing the transactions to reflect all capital letters, and convert numeric values from integer to decimal values.

SQL code for implementing and/or actually performing data transformations may be generated by system 100. System 100 may, upon a selection of a specific SQL implementation, convert the SQL-neutral expressions into SQL implementation-specific code. This code generation may be done for any number of various SQL implementations using the same SQL-neutral DTM 112.

System 100 may allow user 102 to build graphical representation 104, representing one or more data transformations, using one or more components 106. User 102 may include any user(s) of system 100. For example, user 102 may include one or more users, such as database administrators, programmers or other engineers, who may be tasked to build data transformations and/or migrate data among one or more DBMSs. In other example embodiments, user 102 may include one or more automated systems designed to build data transformations on system 100.

Components 106 may include SQL-neutral expressions for universal SQL functionality and/or other features common amongst multiple SQL implementations. In other example embodiments, if a specific SQL implementation has been specified or selected, components 106 may include additional components specific to the chosen SQL implementation.

In the example of FIG. 1, components 106 may generally include transformation components 106A and process components 106B, while other example embodiments may include additional and/or different components and/or categorizations of components. User 102 may drag one or more components 106 (i.e., transformation components 106A, process components 106B and/or other components), representing at least a subset of the universal SQL functionality as expressed in SQL-neutral expressions, and drop the components 106 onto a canvas to design and/or construct graphical representation 104 of a data transformation. Transformation component 106A may include transformation procedures or functions to be performed on at least a portion of source and/or target data. Example transformations as represented by transformation component 106A may include sort, copy, filter, join, row count, union, split and data type converter operations.

Process component 106B may include components that represent logic, execution, sequencing and/or other decision processes that may be made amongst transformation components 106A. Example process components 106B may include a start, decision, multi-task, multi-process, success, and error components. Using transformation components 106A and process components 106B, user 102 may design and/or assemble graphical representation 104 for one or more data transformations using SQL-neutral expressions.

Graphical representation 104 may include any combination and/or sequencing of components 106 assembled to perform one or more data transformations or other processes on or with respect to source and/or target data. Graphical representation 104 may include, for example, a directed flow chart wherein an execution or processing of various transformation components 106A is directed by one or more process components 106B.

A model viewer 108 may provide an interface by which user 102 may build graphical representation 104 of one or more data transformations using components 106. Operating in a graphical user interface (GUI) 130, model viewer 108 may, for example, provide a palette of components 106 that user 102 may drag-and-drop onto a canvas area to construct graphical representation 104. Model viewer 108 may also include a code portion whereby user 102 may view and/or modify SQL code that may be generated by system 100 (e.g., corresponding to the selected components 106), and/or write new or custom SQL code.

System 100 may then, based on graphical representation 104, construct or determine DTM 112 based on the components 106 and/or other SQL-neutral expressions from graphical representation 104, whereby DTM 112 may be constructed using SQL-neutral terminology and expressions. System 100 may also provide corresponding SQL code for whatever specific SQL implementation(s) user 102 selects. System 100 may allow user 102 to select, at any point before, during and/or after designing the data transformation, a specific SQL implementation for which to generate code. System 100 may then provide the specific SQL code corresponding to the user's selection(s). According to an example embodiment, the code generation (by system 100) and model design (by user 102) may be performed substantially simultaneously whereby, upon a dropping of a component 106 onto the canvas, system 100 may provide at least a portion of the SQL code corresponding to the dropped component 106 and may enable user 102 to review and/or modify the SQL code, as needed.

In providing substantially simultaneous component-level code generation, system 100 allows user 102 to verify and/or modify SQL code for any components 106 selected for the designed data transformation(s) as graphical representation 104 is being constructed, rather than having to wait until the end of the model design process to review an entire SQL script 120 to make SQL code modifications and/or customizations. Thus, user 102 may have immediate access to the SQL code corresponding to the selected components, allowing substantially simultaneous building of graphical representation 104 and modifying/verifying the corresponding SQL code, as necessary.

A model builder 110 may generate the data transformation model (DTM) 112 based on graphical representation 104. DTM 112 may include an SQL-neutral representation of graphical representation 104. Model builder 110 may, for example, construct DTM 112 based on metadata captured by model viewer 114 about graphical representation 104, wherein the metadata may describe at least a portion of the data transformation depicted in graphical representation 104. The metadata may include, for example, information about which components 106 have been selected and the processing and/or order of execution of the selected components 106. Constructing DTM 112 in SQL-neutral expressions may allow the same DTM 112 to be used to produce SQL code for multiple specific SQL implementations.

According to an example embodiment, DTM 112 may include an internal representation of graphical representation 104, whereby components 106, from graphical representation 104, may be represented as logic 114. For example, transformation logic 114A may correspond to transformation component 106A, and process logic 114B may correspond to process component 106B. While graphical representation 104 may include a visual display of a data transformation (for user 102), DTM 112 may include a more formalized and/or structured model of the data transformation that may be used within modeling and code generation system (MCGS) 132. According to an example embodiment, logic 114 may include pseudo-code written in SQL-neutral expressions. As referenced above, from DTM 112, MCGS 132 may provide implementation-specific SQL code for the designed data transformation across one or more SQL implementations.

Code generator 118 may generate SQL code corresponding to the data transformation of graphical representation 104 and based on a selection 122. Selection 122 may include a selection of a specific SQL implementation(s) for which to generate SQL code. For example, selection 122 may be made from a list of various SQL implementations. User 102 may make selection 122, but may also change selection 122 at any time. As referenced above, user 102 may make multiple selections of SQL implementations for which to generate SQL code. Example SQL implementations include, but are not limited to versions of SQL as supported by Sybase IQ, Sybase ASE, Sybase SQL Anywhere, Oracle and Microsoft SQL Server.

According to an example embodiment, code generator 118 may generate or provide component SQL 126 from an SQL database (DB) 124. SQL DB 124 may include code conversions and/or features of multiple varying SQL implementations to be included in SQL script 120. For example, using SQL DB 124, code generator 118 may generate SQL code for one or more specific SQL implementations based on the SQL-neutral expressions used in DTM 112. In another example embodiment, multiple code generators 118 may be used, whereby each code generator 118 may generate implementation-specific SQL code for one or more SQL implementations.

As referenced above, SQL script 120 may include custom SQL 128. Custom SQL 128 may include SQL provided by user 102. Custom SQL 128 may include for example, component SQL 126 that has been modified by user 102 and/or new or additional SQL or custom-written components as provided by user 102. In an example embodiment, while an unmodified component 106 may be translated to new SQL implementation-specific SQL code (e.g., component SQL 126) upon a new SQL implementation selection 122, custom SQL 128 may be "locked" such that its SQL code remains unmodified or un-translated by the new selection 122. Locking the custom SQL 128 may minimize the chance for errors that may arise from attempting to translate implementation-specific SQL code as provided by user 102 into implementation-specific SQL code for a different SQL implementation. In other example embodiments, code generator 118 may convert or translate those portions of custom SQL 128 for which SQL DB 124 includes conversion information and may indicate or warn a user that portions of custom SQL 128 may or may not have been changed.

According to an example embodiment, code generator 118 may generate SQL code at two different levels, a component level and an execution level. In an example embodiment of component-level code generation, code generator 118 may generate SQL code for a specific SQL-implementation during the model generation process. For example, responsive to user 102 selecting transformation component 106A to be included in graphical representation 104, code generator 118 may generate corresponding component SQL 126A for SQL script 120, whereby component SQL 126A may be provided to user 102 for review and/or customization.

The execution-level code generation by code generator 118 may include weaving component SQL 126 (e.g., component SQL 126A and 126B) together with any custom SQL 128 and injection points 134 (i.e. injection point code described herein below) to form SQL script 120. SQL script 120 may then be plugged into another code set, and/or executed (e.g., by execution engine 142) to execute the modeled or designed data transformation(s).

In addition to the component SQL 126 and custom SQL 128, SQL script 120 may include other instrumentation or functionality as well. For example, SQL script 120 may include SQL code for monitoring execution, recovery in case of failure, and/or creating log files of execution and/or failures. According to an example embodiment, user 102 may select which instrumentation user does and/or does not desire to be included with SQL script 120 and/or during execution. Other example embodiments may not include instrumentation-level code generation and may only include execution-level code generation.

According to an example embodiment, SQL script 120 may include transactional settings, whereby several portions and/or lines of the SQL code may be grouped together and considered transactions. A transaction may include one or more lines of SQL code that are considered to be part of a process, whereby if an execution fails at any point during the execution of a transaction, the entire transaction may be deemed to have failed. As such, the monitoring instrumentation, as may be included in SQL script 120, may include a logging function, whereby transactional portions of SQL script 120 may be tracked with regards to the results of their execution (e.g., whether they resulted in errors or successes).

Further instrumentation of SQL script 120 may include transaction rollback and/or restart instrumentation. During transaction rollback, if a transaction begins execution but never finishes (e.g., due to an error or shutdown), the execution may be rolled back to the previously completed transaction, and the rolled back transaction may be restarted. Restart instrumentation may require a user 102 and/or other system administrator to restart at least a portion of system 100 after a non-recoverable failure that may have occurred during execution. Then, for example, the restart instrumentation may resume execution from where it previously left off.

As referenced above, SQL script 120 may include injection points 134, which may include portions of SQL script 120 where information is determined at run-time (e.g., during execution) of SQL script 120. For example, injection point 134 may be used by (and/or represented by) a process component 106B to determine which transformation component 106A to next execute, per graphical representation 104, based on data and/or input determined at run-time. The injection point data may include, for example, data provided by a user via a run-time prompt and/or a run-time calculation made using source and/or target data or other reference data. The data determined or otherwise inserted at injection point 134 may change or affect which SQL code of SQL script 120 is or is not executed during one or more executions of SQL script 120. For example, target and/or SQL-implementation neutral code, such as instrumentation-level code, may be injected at runtime for instrumentation that would work regardless of which specific SQL implementation has been selected. As such, the runtime environment may not be required to know the target SQL implementation. Injection points 134 may allow, for example, late binding of SQL code, such as instrumentation code, to be executed with a pre-compiled or otherwise generated SQL script 120.

According to an example embodiment, injection points 134 may be implemented as tokens that are processed at runtime or execution time and may be used to implement restart instrumentation. A token may be used to track execution amongst the components 126, 128, and/or other transactions of SQL script 120. As referenced above, a transaction may include a portion of a component 126, 128, an entire component 126, 128, and/or several components 126, 128, or portions thereof, that are designated as being one transactional or execution unit, where if one portion of the unit fails to properly and/or fully execute, then the entire unit is considered to have failed to properly and/or fully execute.

For example, an injection point 134 may be at the beginning and at the end of a transaction unit, indicating the beginning and ending of the transaction, such as {Task1.begin} and {Task1.end}. During runtime, these example injection points 134 may be translated into valid SQL statements such as INSERT, UPDATE and/or DELETE that are executed against a state table or log. The injection point 134 (e.g., token) may be looked up at runtime and replaced with SQL code corresponding to the injection point 134. When SQL script 120 is restarted after a failure, the token may be looked up in the state table or log to determine which transactional component did not complete (e.g., does not have the SQL code corresponding to the injection point 134 {Task.end} statement). Then, for example, execution may resume from the beginning of the transactional task that did not complete.

According to an example embodiment, system 100 may be arranged in a model-view-controller architecture (MVC) allowing for isolation of the view portion, the model portion and controller portion of the architecture. Accordingly, under the view portion of the MVC, user 102 may interact and/or interface with model viewer 114 via GUI 130. Model builder 110 of the model portion of MVC may handle the input from user 102, and convert the event(s) or input into corresponding logic 114 by which to build the model or DTM 112. Code generator 118, or controller portion of MVC, may then be notified of the change to DTM 112, and may provide corresponding component SQL 126 to user 102 via model viewer 114 as displayed in GUI 130. Model viewer 114 may then wait for further action/input by user 102 and the cycle may repeat until user 102 has completed building graphical representation 104 of a data transformation. In an example embodiment, SQL script 120 may be continuously built as user 102 makes changes to DTM 112 through modifications of graphical representation 104. Then, upon a completion of graphical representation 104, code generator 118 may then assemble the completed execution-level SQL script 120, as discussed above.

GUI 130 may include any interface by which user 102 may interact with MCGS 132. GUI 130 may include for example a monitor used to display model viewer 114. For example, GUI 130 may include a touchscreen display user 102 may manipulate to create graphical representation 104. Or, for example, GUI 130 may include a monitor or other display, whereby user 102 uses a mouse and/or keyboard to construct graphical representation 104 as displayed on GUI 130.

MCGS 132 may be operating one or more CPUs or other processors interacting with GUI 130. Then, for example, as user 102 drags and drops a component 106 into a canvas portion of model viewer 114, MCGS 132 may receive or retrieve this interaction or event. Upon receiving notice of the interaction event of model viewer 108, model builder 110 may construct a corresponding portion of DTM 112 and code generator 118 may generate corresponding SQL code (e.g., component SQL 126) for SQL script 120 and/or to provide to user 102 via GUI 130.

According to an example embodiment, MCGS 132 may include a debugger 138. Debugger 138 may execute (and/or simulate an execution of) portions of SQL script 120, including component SQL 126, custom SQL 128 and/or injection point 134 and allow user 102 to see a preview 140 of the execution. Debugger 138 may perform the execution on real data (or a copy thereof) and show, in preview 140, results of performing the processes or transformations modeled in graphical representation 104 and/or coded in SQL script 120. Being able to view the results of the execution of various components 106 of graphical representation 104 may allow user 102 to more effectively design and/or modify graphical representation 104 to obtain the data transformation (results) user 102 desires. Debugger 138 may be run at any point during the data transformation modeling building process.

Debugger 138 may allow user 102 to step through the execution of one or more of the components 106 of graphical representation 104 and/or transactions of SQL script 120. According to an example embodiment, debugger 138 may scan SQL script 120, including custom SQL 128, to determine whether any non-transactional commands exist, for example, whether automatic tables are created or other transactions are automatically performed. Then, for example, debugger 138 may track these changes, and when user 102 has exited the debugging process, debugger 138 may clean up or roll back any (non-user directed) changes made during the debugging session to reflect the state of the system 100 before the debugging session. According to an example embodiment, this roll back by debugger 138, may be performed as a single transaction and/or transactional unit. Debugger 138 will not, however, roll back changes made by user 102 to SQL script 120 during the debugging session, unless indicated to do so by user 102.

Preview 140, as may be provided by debugger 138 during a debugging process, may include one or more views of source data 136A and/or target data 136B as the modeled data transformation (e.g., via SQL script 120) is being executed on the source data 136A. Debugger 138 may allow user 102 to step through a processing of each component 106 of graphical representation 104 (as debugger 138 executes the corresponding SQL code) and view how the processing of the components 106 affects the data 136 (source data 136A and/or target data 136B) and/or other system statuses. Debugger 138 then may allow user 104 to check the logical structure of the designed data transformation by stepping through a simulated execution of the modeled data transformation on the data to be transformed. During the debugging process, user 102 may adjust or modify graphical representation 104 and/or SQL script 120. After user 102 has completed debugging the data transformation, all the data 136 will remain or return to its pre-debugging state. For example, after completion of the debugging process, debugger 138 may roll back all the changes that may have been made during the debugging process in a single transaction.

As referenced above, a data transformation may transform source data 136A into and/or onto target data 136B. In an example embodiment, source data 136A may be read from a source database and transformed onto a target database containing target data 136B. Source data 136A and target data 136B may be stored on one or more databases and on one or more tables. For example, source data 136A may include data from a first table in a database, and target data 136B may include data in a second table in the same database, whereby the data transformation is built to convert (at least a portion) of source data 136A into a format compatible with target data 136B in the target table. In another example embodiment, source data 136A may represent data prior to applying the modeled data transformation, and target data 136B may represent data after applying the modeled data transformation.

MCGS 132, according to an example embodiment, may include an execution engine 142. Execution engine 142 may execute SQL script 120 and/or portions thereof to perform or execute the modeled data transformation(s) on data 136. As referenced above, SQL script 120 may include the SQL code required for implementing or executing the designed data transformation(s) for a selected SQL implementation, including, for example, instrumentation-level code.

According to another example embodiment, rather than executing SQL script 120 on its own using execution engine 142, user 102 may desire to execute SQL script 120 as a procedure to be used with another program and/or SQL code. Then, for example, code generator 118 may generate SQL script 120 as a stored procedure that user 102 may use and/or transfer to another program or sequence of SQL code. The stored procedure code, however, would not include various aspects of code discussed above, such as instrumentation and injection points 134. The stored procedure code may then be used, for example, by user 102 to perform transformations directly on target data 136B or another data source.

According to an example embodiment, execution engine 142 may use one or more staging tables 144 during the execution. Staging tables 144 may include intermediary tables where the data is transformed based on the data transformation(s) of SQL script 120. Staging tables 144 may allow execution engine 142 to execute the data transformation without corrupting the original source and/or target data, especially in the case of a failure or other error-causing event. In an example embodiment, staging tables 144 may include temporary and/or dynamically created tables, which may be removed and/or the contents of which may be discarded after execution. According to an example embodiment, debugger 138 may use staging tables 144 to perform the debugging process as discussed above.

Staging tables 144 may be used to hold intermediate data moved from source data 136A into target data 136B. This may allow some transformations to be executed on source data 136A retrieved from a source database, if target data 136B on a target database is not involved. Then, for example, target transformations, involving data on a target database, may occur entirely on a target database. In an example embodiment, user 102 may determine whether or not data from staging tables 144 is removed as part of and/or upon completion of a transformation process.

System 100 may be used in many different scenarios including extract-transform-load (ETL) and extract-load-transform (ELT) situations. An ETL process involves extracting data from a source database, transforming the data by performing one or more data transformations and loading the transformed data onto a target database (which may be the same database as the source database). System 100 may be useful in either scenario ETL or ELT (in which the load and transform steps are reversed when compared to the ETL), particularly with an ELT process during which data may be transformed directly on the target database through the use of staging tables 144. Furthermore, the data models (DTM 112), as designed with system 100, may be used not only to transform extracted data for loading onto a target database, but may also be used for efficient data extraction processes and for updating or maintaining data.

Thus, as described, system 100 may allow user 102 to graphically design graphical representation 104 of one or more data transformations for transforming source data 136A into target data 136B using SQL-neutral expressions and universal SQL functionality. System 100 may also develop an internal DTM 112, maintaining the SQL-neutral expressions, which may be used to provide implementation-specific SQL code corresponding to DTM 112 in any number of varying SQL implementations which may be used to execute the modeled data transformation(s).

Figure 2:
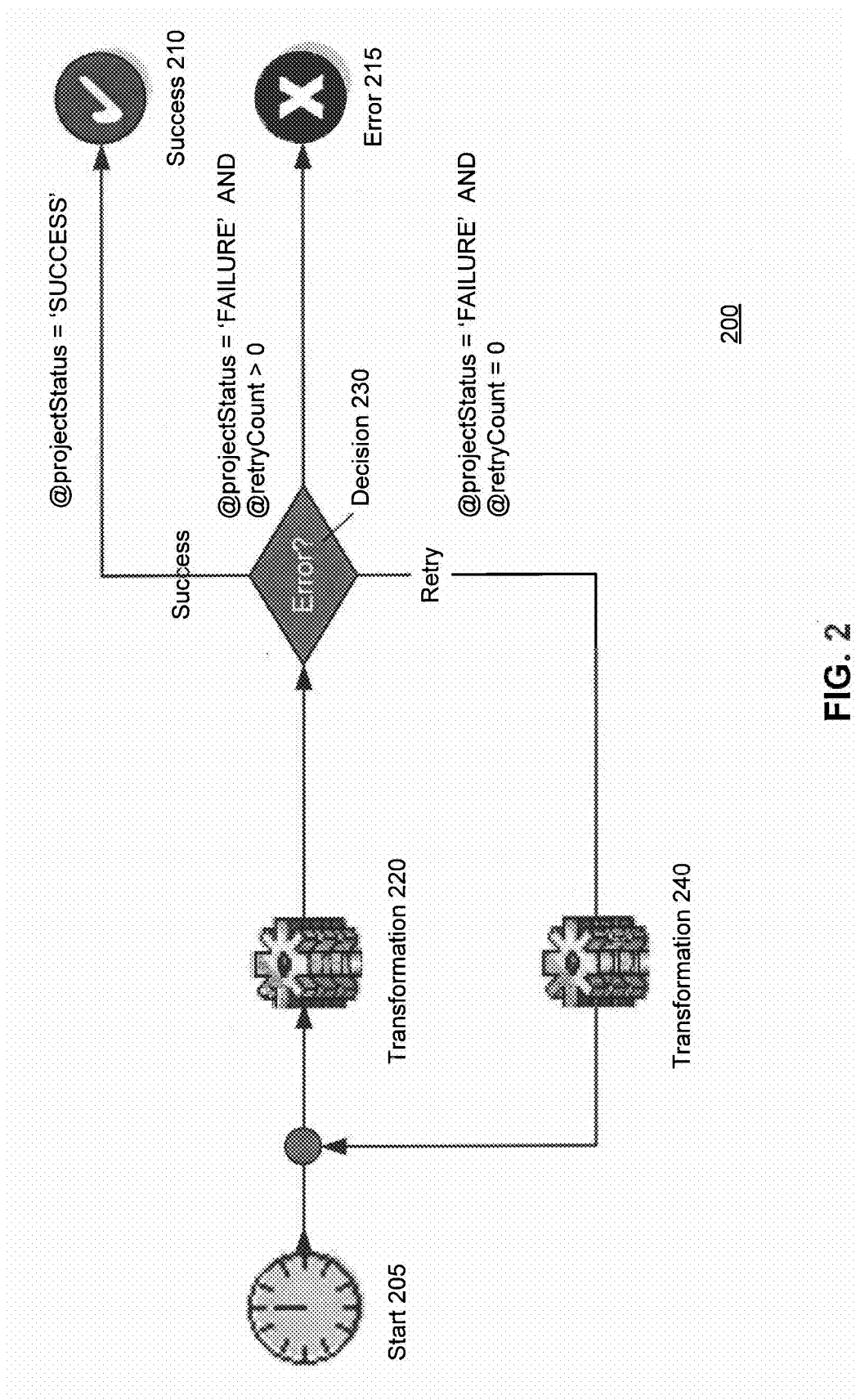
FIG. 2 is an exemplary embodiment of a graphical representation of a data transformation.

FIG. 2 is an example graphical representation 200 of a data transformation in accordance with an embodiment of the invention. The execution and/or processing of graphical representation 200 may begin at a start component 205 and complete with a success component 210 or an error component 215.

Start 205 may be responsible for initializing the project or process of graphical representation 202. For example, processing may begin with start 205, which may generate a log record indicating that the modeled data transformation process has begun, and may initialize any variables that may need to be initialized.

From start 205 processing may continue to transformation component 220. Transformation component 220 may include one or more processes that indicate how data will be modified or transformed and/or what will be done with the transformed data. As referenced above, in an embodiment, there are two types of transformations, generic and custom transformations, whereby the generic transformations may be selectable via model viewer 114, and the custom transformations may be entirely designed by user 102 and/or may include modified versions of generic transformations. If transformation component 220 includes multiple transformations, the transformations may be performed sequentially and/or based on logic as provided and/or modeled by user 102.

Transformation component 220 may allow for a less cluttered and/or easier to read graphical representation 200. For example, rather than having several individual components appear on graphical representation 200 that are to be sequentially executed, transformation component 220 may function as a container that includes multiple components to be executed. Through including several components in a container, processing logic of graphical representation may be easier to determine and modify.

In an example embodiment, transformation component 220 may work as a transactional container, whereby either all of the components are executed successfully or none of them are. Other example embodiments, in which transactional processing is turned off for the transformation component 220, the components may be processed individually as their own transactions and a failure of one may not necessarily cause a failure of all to be logged. Transformation component 220 may also allow for recursive data transformation models to be built, whereby a transformation component 220 may lead to another recursive level.

From transformation component 220 processing may continue to decision component 230. Decision component 230 may include one or more logical expressions that result in a true or false result. According to an example embodiment, decision component 230 may operate in one of two modes. In a first mode, decision component 230 may act as an "IF"-"ELSE IF"-"ELSE" block, while in a second mode, decision component 230 may act as a series of independent IF statements. When, for example, decision component 230 is operating in the first mode, upon execution or processing, decision component 230 will execute the first TRUE condition that results from the IF statements in its execution path. When, however, decision component 230 is operating in the second mode, each independent IF statement may be executed.

Decision component 230 may include a single thread path component, with no parallel execution, so as to keep its functionality universal to various SQL implementations. In other example embodiments, the functionality of decision component 230 may be modified depending on which SQL implementation has been selected.

As shown in graphical representation 200, decision component 230 may include three possible output ports, including a success port, an error port and a retry port. It should be understood, however, that any number of output ports may be defined by user 102, and the decision component 230 described herein with three output ports is merely exemplary. Success port and error port lead to success component 210 and error component 215, respectively, which may provide exit points for a process or data transformation. While success may signify that the data transformation has completed successfully and may log a corresponding message indicating success, error may signify that the data transformation has ended in an error state and may log a corresponding error message.

For a retry result, a user-defined variable may track the number of retries. As shown in graphical representation 200, if decision component 230 results in retry, then transformation component 240 may be executed, after which processing may loop back and re-execute transformation component 220 and decision component 230 again. It should be understood the transformation component 240 may include functionality similar to that of transformation component 220, though the various transformation processes and/or logic included with transformation component 240 may differ from that of transformation component 220.

Decision component 230 operates so as to include universal SQL functionality and allows for the design of complex data transformations and loops. For example, through using user-defined and/or iteration variables (e.g., that iterate with each passage by them), a data transformation may track how many times a loop has executed and perform an action (e.g., exit) upon reaching a certain number of iterations, or whereby each iteration of the loop may take a different path. Or, for example, rather than having a while loop (as is common in some programming architectures), the SQL of a component may include a reference to the next component to execute, which may include a previously executed component as shown in graphical representation 200, thus simulating the functionality of a while loop.

According to an example embodiment, generated SQL (e.g., SQL script 120) may include execution sequencing and/or flow control using one or more variables. For example, SQL script 120 may include a master loop with a variable that is used to determine which is the next component to execute. Then, for example, each component, upon completion of its execution, rather than pointing to the next component to be executed, may set the value of the variable to the next component to execute in the sequence. The variable may initially be set to start component 205, for example, and then may be set (e.g., via injection point 134) by execution engine 142 to determine which component to begin with in the event of a restart process as discussed above.

Figure 3:
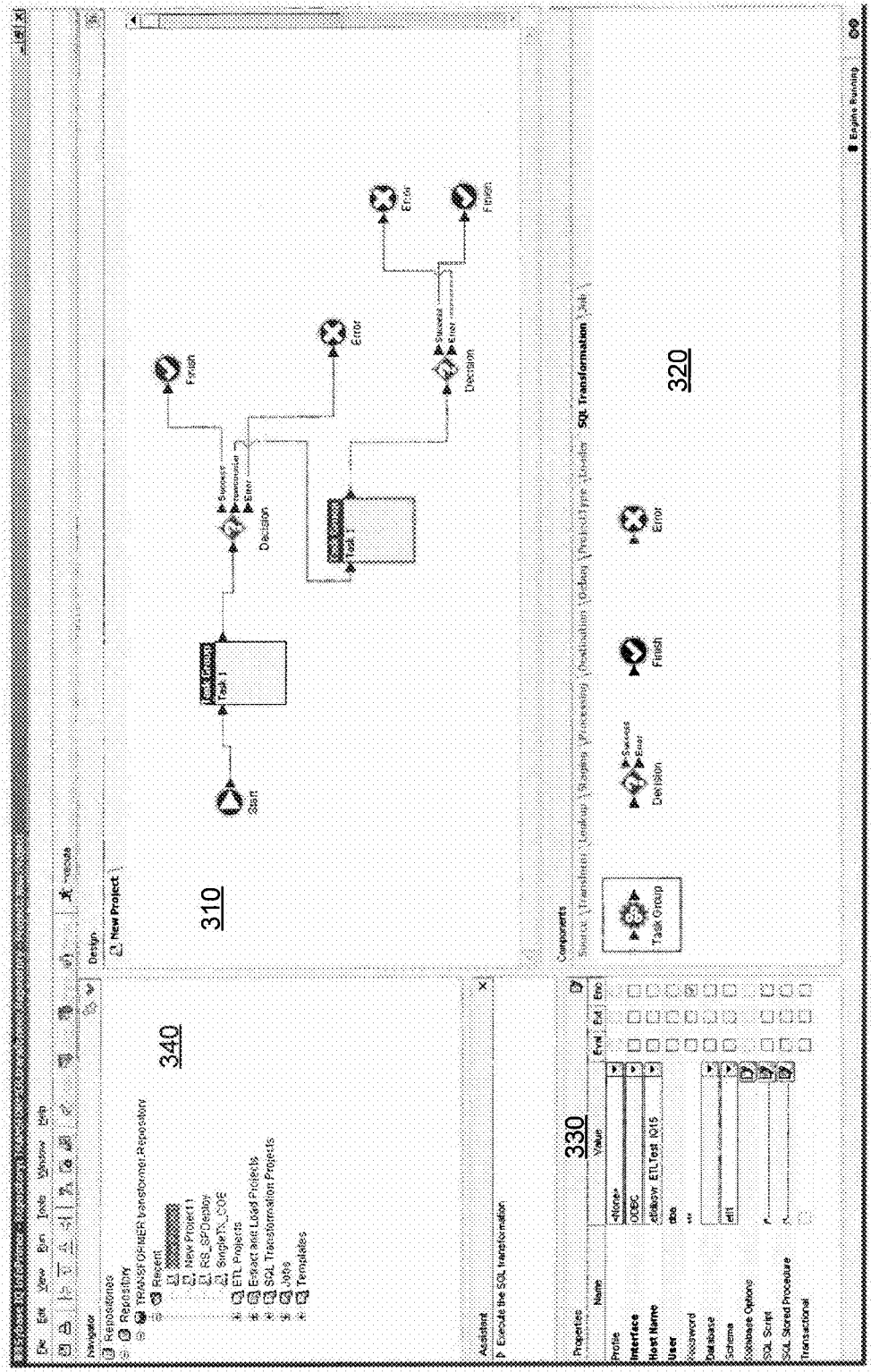
FIG. 3 is an example embodiment of a model viewer.

FIG. 3 is an example embodiment of a model viewer 300. Model viewer 300 may be an example embodiment of model viewer 114 of FIG. 1. Model viewer 300 may include multiple sections or portions used to display information about a modeled data transformation and/or portions thereof. Model viewer 300 may include a canvas 310, a palette 320, a properties portion 330 and a navigator 340 portion.

Canvas 310 may include that portion of model viewer 300 for displaying the selected components and arrangements and/or logic for graphical representation 104. Palette 320 may display one or more selectable components that may be included in graphical representation 104. For example, user 102 may drag-and-drop a component 106 from palette 320 onto canvas 310 to select that component for inclusion with graphical representation 104. Selectable components, as shown, may be grouped into various categories based on their usages and/or applications, thus making it easier for user 102 to find and/or select the appropriate component(s) to include on canvas 310.

Properties portion 330 may include a display of properties of the components. User 102 may view and/or modify the properties displayed and adjust the functionality of the selected and corresponding components. Navigator 340 may allow user 102 to quickly navigate amongst one or more modeled data transformations.

Figure 4:
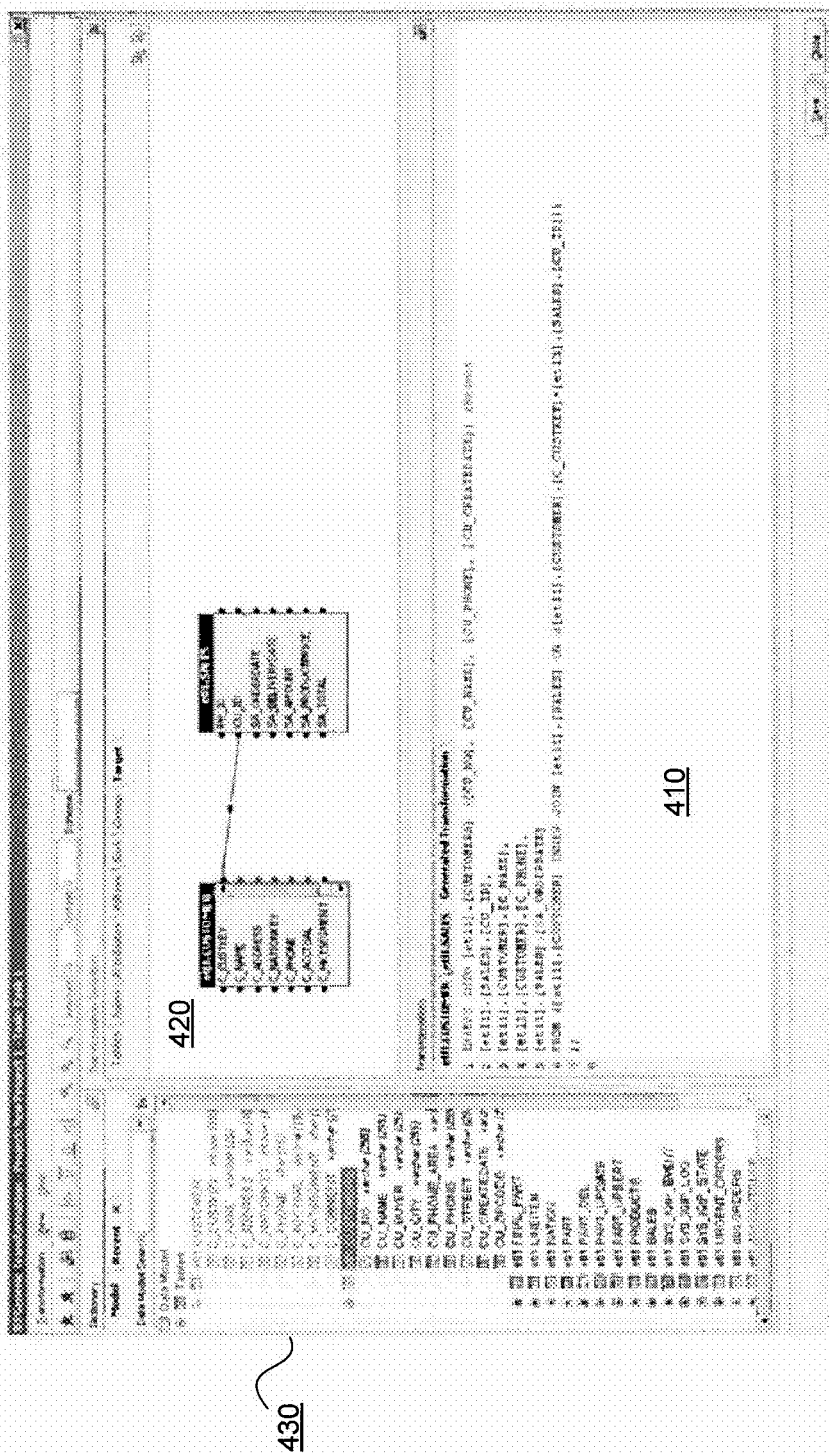
FIG. 4 is an example embodiment of a model viewer.

FIG. 4 is an example embodiment of a model viewer 400. Model viewer 400 may be an example embodiment of model viewer 114 of FIG. 1. Model viewer 400 may include multiple sections or portions used to display information about associating a modeled component with data and/or modifying or viewing the corresponding SQL code of a component. Model viewer 400 may include a code portion 410, a canvas portion 420, and a navigator portion 430.

Code portion 410 may display SQL code corresponding to a selected component, whereby user 102 may view and/or modify the SQL code. Canvas portion 420 may include a visual depiction of data being affected or otherwise associated with a selected component. Navigator portion 430 may allow a user to view selectable data that may or may not be included in canvas portion 420. For example, a user may drag items from navigator portion 430 and drop them into canvas portion 420.

Figure 5:
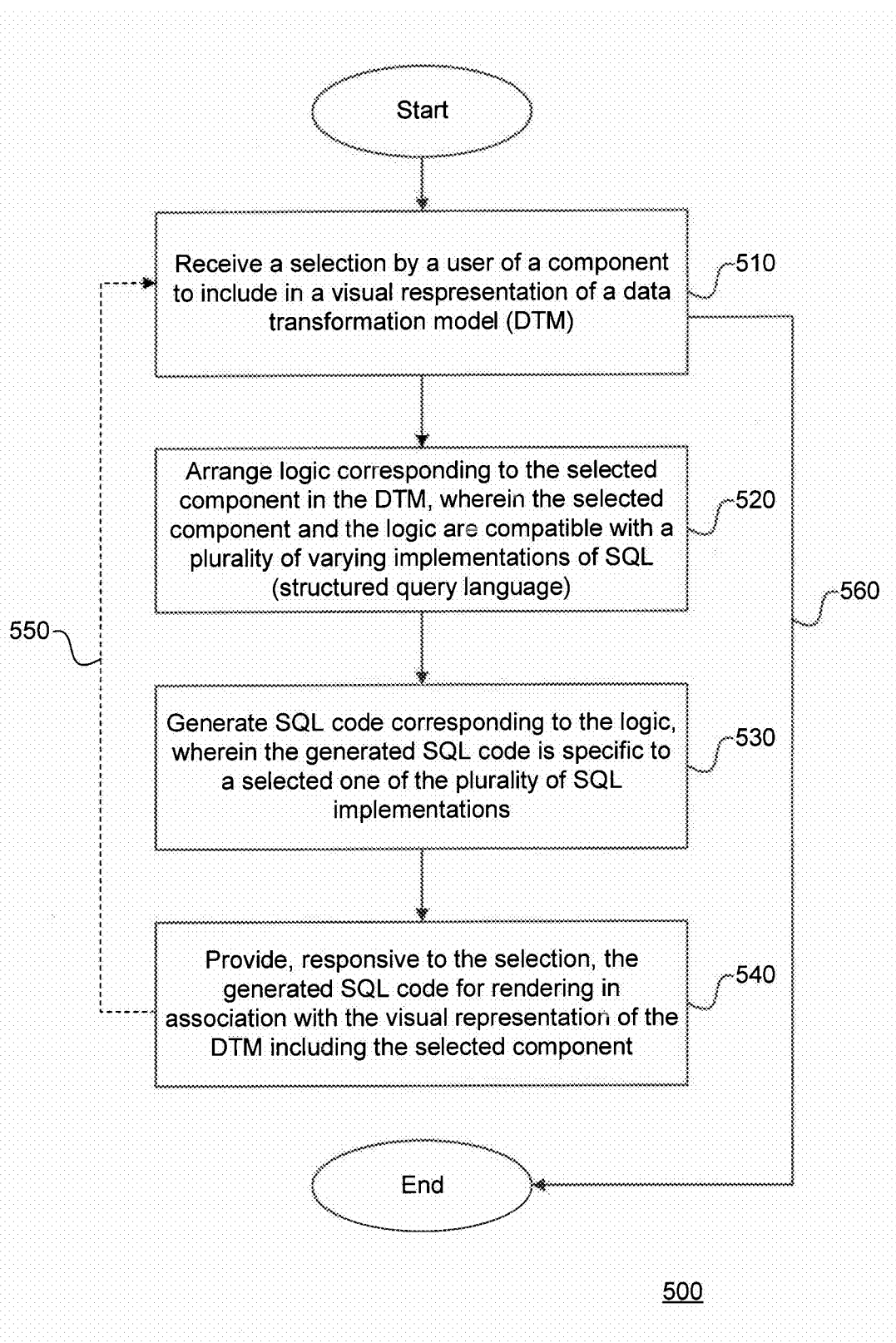
FIG. 5 is an exemplary flowchart of a method for generating SQL code specific to a selected SQL implementation from a data transformation model, according to an embodiment of the invention.

FIG. 5 is an exemplary flowchart of a method 500 for generating SQL code specific to a selected SQL implementation from a data transformation model. At step 510, a selection by a user of a component to include in a visual representation of a data transformation model (DTM) may be received. For example, model viewer 114 may receive a selected transformation component 106A by user 102 in graphical representation 104. Or, for example, model viewer 300 may determine a drag-and-drop operation of a component from palette 320 onto canvas 310.

At step 520, logic corresponding to the selected component may be arranged in the DTM, wherein the selected component and the logic are compatible with a plurality of varying implementations of SQL (structured query language). For example, model builder 110 may arrange transformation logic 114A, corresponding to a selected transformation component 106A, in DTM 112, wherein transformation logic 114A and transformation component 106A are expressed using SQL-neutral expressions.

At step 530, SQL code corresponding to the logic may be generated, wherein the generated SQL code is specific to one of the plurality of SQL implementations. For example, code generator 118 may generate component SQL 126A corresponding to transformation logic 114A, based on a selected SQL implementation made via selection 122. If user 102 later makes another selection 122, then code generator 118 may generate another component SQL 126A corresponding to the newly selected SQL implementation.

At step 540, responsive to the selection, the generated SQL code may be provided for rendering in association with the visual representation of the DTM including the selected component. For example, model viewer 114 may render the generated SQL code in code portion 410 in association with canvas portion 310. In other example embodiments, any of the various combinations of the portions shown in FIG. 3 and/or FIG. 4 may be rendered in association with one another by model viewer 114. In an example embodiment, user 102 may select which portion(s) user 102 desires to view.

At step 550, method 500 may loop back or begin again upon another selection by the user. For example, model viewer 108 may wait to determine another event by user 102. The event may include, for example, a selection of another component 106 to be included in graphical representation 104, or a new visual arrangement of the existing components 106 within graphical representation 104. The method 500 may continuously repeat or loop throughout the model building (e.g., graphical representation 104 building) process whereby user 102 adjusts and/or modifies graphical representation 104.

At step 560, method 500 may complete. For example, at step 560, user 102 may indicate that graphical representation 104 is complete, at which point method 500 would end. However, user 102 may later decide to make additional modifications to graphical representation 104, at which point method 500 may restart at step 510 as previously described.

Figure 6:
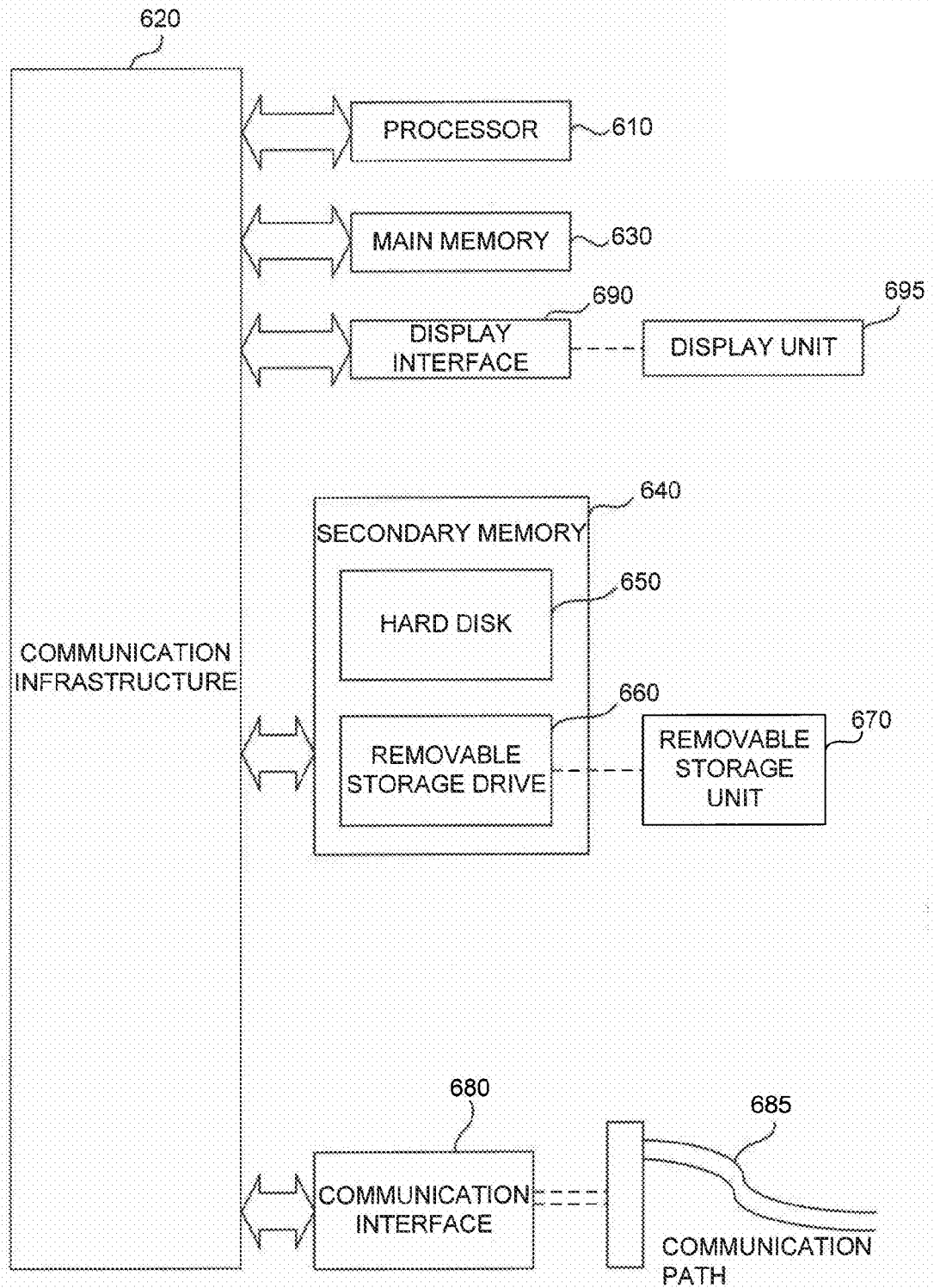
FIG. 6 is an example computer system in which embodiments of the invention can be implemented.

Various aspects of the invention can be implemented by software, firmware, hardware, or a combination thereof, FIG. 6 illustrates an example computer system 600 in which the invention, or portions thereof, can be implemented as computer-readable code. For example, the methods illustrated by flowcharts described herein can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 610. Processor 610 can be a special purpose or a general purpose processor. Processor 610 is connected to a communication infrastructure 620 (for example, a bus or network).

Computer system 600 also includes a main memory 630, preferably random access memory (RAM), and may also include a secondary memory 640. Secondary memory 640 may include, for example, a hard disk drive 650, a removable storage drive 660, and/or a memory stick. Removable storage drive 660 may comprise a floppy disk drive, a magnetic tape drive, an optical disk drive, a flash memory, or the like. The removable storage drive 660 reads from and/or writes to a removable storage unit 670 in a well-known manner. Removable storage unit 670 may comprise a floppy disk, magnetic tape, optical disk, etc. which is read by and written to by removable storage drive 660. As will be appreciated by persons skilled in the relevant art(s), removable storage unit 670 includes a computer usable storage medium having stored therein computer software and/or data.

In alternative implementations, secondary memory 640 may include other similar means for allowing computer programs or other instructions to be loaded into computer system 600. Such means may include, for example, a removable storage unit 670 and an interface (not shown). Examples of such means may include a program cartridge and cartridge interface (such as that found in video game devices), a removable memory chip (such as an EPROM, or PROM) and associated socket, and other removable storage units 670 and interfaces which allow software and data to be transferred from the removable storage unit 670 to computer system 600.

Computer system 600 may also include a communications and network interface 680. Communications interface 680 allows software and data to be transferred between computer system 600 and external devices. Communications interface 680 may include a modem, a communications port, a PCM-CIA slot and card, or the like, Software and data transferred via communications interface 680 are in the form of signals which may be electronic, electromagnetic, optical, or other signals capable of being received by communications interface 680. These signals are provided to communications interface 680 via a communications path 685. Communications path 685 carries signals and may be implemented using wire or cable, fiber optics, a phone line, a cellular phone link, an RF link or other communications channels.

The network interface 680 allows the computer system 600 to communicate over communication networks or mediums such as LANs, WANs the Internet, etc. The network interface 680 may interface with remote sites or networks via wired or wireless connections.

In this document, the terms "computer program medium" and "computer usable medium" and "computer readable medium" are used to generally refer to media such as removable storage unit 670, removable storage drive 660, and a hard disk installed in hard disk drive 650. Signals carried over communications path 685 can also embody the logic described herein. Computer program medium and computer usable medium can also refer to memories, such as main memory 630 and secondary memory 640, which can be memory semiconductors (e.g. DRAMs, etc.). These computer program products are means for providing software to computer system 600.

Computer programs (also called computer control logic) are stored in main memory 630 and/or secondary memory 640. Computer programs may also be received via communications interface 680. Such computer programs, when executed, enable computer system 600 to implement embodiments of the invention as discussed herein. In particular, the computer programs, when executed, enable processor 610 to implement the processes of the invention, such as the steps in the methods illustrated by flowcharts discussed above. Accordingly, such computer programs represent controllers of the computer system 600. Where the invention is implemented using software, the software may be stored in a computer program product and loaded into computer system 600 using removable storage drive 660, interfaces, hard drive 650 or communications interface 680, for example.

The computer system 600 may also include input/output/display devices 690, such as keyboards, monitors, pointing devices, etc. According to an example embodiment, the display interface 690 may be communicatively coupled to a display unit 695 (such as GUI 130).

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A system comprising:
   a processor and a non-transitory memory operatively coupled to the processor;
   a model viewer when executed by the processor is configured to receive a selection, by a user, of a component to include in a visual representation of a data transformation model (DTM) for a database;
   a model builder when executed by the processor is configured to arrange logic corresponding to the selected component in the DTM, wherein the selected component and the logic are compatible with a plurality of different implementations of SQL (structured query language) wherein the different implementations of SQL comprise at least one or more SQL code features specific to each implementation, and wherein the logic comprises at least one custom-written SQL component including SQL code specific to a particular implementation of SQL;
   a code generator configured to:
      receive a selection of one or more of the plurality of different SQL implementations for which to generate code, wherein the code generator when executed by the processor is configured to generate SQL code corresponding to the logic of the components and specific to the selected one or more SQL implementations, and
      determine if the custom-written SQL component includes conversion information for one of the selected plurality of SQL implementations different from the particular implementation of SQL associated with the SQL code of the custom-written SQL component,
      wherein if the conversion information exists then convert the SQL code of the custom-written SQL component based on the conversion information for the selected SQL implementation,
      wherein if the conversion information does not exist then the SQL code of the custom-written SQL component is not modified based on the selection of one or more of the plurality of SQL implementations that are different from the particular implementation of SQL associated with the SQL code of the custom-written SQL component, and
   wherein the generated SQL code, when executed, performs one or more data transformation on data of the database; and
   the model viewer being further configured to provide the generated SQL code for rendering substantially simultaneously with the visual representation of the DTM including the selected component.

2. The system of claim 1, further comprising an execution engine configured to extract data from a source database,
   transform the data based on an SQL script comprising the generated SQL for one or more selected components in the visual representation of the DTM, and
   publish the transformed data to a target database;
   wherein the execution engine is executed by the processor.

3. The system of claim 2, wherein the execution engine is further configured to load the extracted data onto one or more staging tables, and
   transform the loaded data based on an SQL script comprising the generated SQL code for one or more selected components in the visual representation of the DTM.

4. The system of claim 1, wherein the visual representation of the DTM includes a plurality of components, including one or more transform components configured to provide one or more transformations on data and one or more process components configured to provide a process flow amongst the one or more transform components, and wherein the one or more transform components are executed by the processor.

5. The system of claim 1, further comprising a debugger configured to provide a preview of the generated SQL code as executed upon data received from a source database and as published to a target database, wherein the debugger is executed by the processor.

6. The system of claim 5, wherein the debugger tracks the execution of the generated SQL code, and reverses any changes made to the target database during the execution, upon a completion of a debugging process.

7. The system of claim 5, wherein the debugger is configured to provide the preview upon a completion of an execution of the generated SQL code corresponding to each component of the representation of the DTM.

8. The system of claim 1, wherein the code generator is configured to generate an SQL script for executing the generated SQL code of the one or more selected components of the visual representation of the DTM, wherein the SQL script provides a monitoring functionality for monitoring the execution.

9. The system of claim 1, wherein the selected component includes a decision component configured for one or more inputs and a plurality of outputs, wherein the decision component is configured to decide, based at least in part on the one or more inputs, which one of the plurality of outputs to execute, wherein the decision component is executed by the processor.

10. The system of claim 1, wherein the selected component includes a decision component configured to operate as a loop, whereby the decision component selects one of a plurality of decision modules to execute based on one or more inputs to the decision component, and wherein each of the plurality of decision modules determines a next decision module to execute within the decision component, wherein the decision component is executed by the processor.

11. The system of claim 1, wherein the generated SQL code includes an injection point configured to make a run-time decision about how to execute the generated SQL code, wherein the injection point is executed by the processor.

12. The system of claim 11, wherein the injection point is used in a restart process, wherein during an execution of the generated SQL code the injection component indicates which of the decision modules is currently being executed and which of the decision modules have completed execution.

13. The system of claim 12 wherein during the execution, an executed injection point is replaced with corresponding SQL code.

14. The system of claim 1, wherein the code generator is configured to update the generated SQL code based on and specific to a second selected one of the plurality of SQL implementations.

15. The system of claim 1, wherein the component includes a sub-process component, wherein the sub-process component comprises a container comprising one or more other components, wherein the sub-process component abstracts the visual representation of the DTM with regard to the one or more other components.

16. The system of claim 15, wherein the generated SQL code corresponding to the sub-process component comprises a recursive call to generated SQL code corresponding to the one or more other components.

17. The system of claim 1, wherein the code generator is configured to receive a selection of two or more of the plurality of different SQL implementations for which to generate code, wherein the code generator generates SQL code corresponding to the logic and specific each of the selected two or more SQL implementations.

18. The system of claim 1, wherein the code generator is configured receive another selection of a different SQL implementation from the SQL implementation associated with the selection, and wherein the code generator generates SQL code corresponding to the logic and specific to the different SQL implementation.

19. The system of claim 1, wherein the custom-written SQL component is received from a user.

20. The system of claim 1, further comprising:
providing a notification that the SQL code of the custom-written SQL component was converted.

21. A method comprising:
rendering a visual representation of a data transformation model (DTM) in a model viewer, wherein the model viewer is configured to enable a user to select components to include in the visual representation, wherein the components are compatible with a plurality of varying implementations of SQL (structured query language) wherein the varying implementations of SQL comprise at least one or more SQL code features specific to each implementation and represent transformations to perform on source data of a database and wherein the components include at least one custom-written SQL component including SQL code specific to a particular implementation of SQL;
receiving a selection of one or more of the plurality of different SQL implementations for which to generate code;
generating SQL code corresponding to the selected components of the visual representation of the DTM, wherein the generated SQL code is specific to the selected one or more of the plurality of SQL implementations and wherein the generated SQL code, when executed, performs one or more data transformation on data of the database;
determining if the custom-written SQL component includes conversion information for one of the selected plurality of SQL implementations different from the particular implementation of SQL associated with the SQL code of the custom-written SQL component,
wherein if the conversion information exists then converting the SQL code of the custom-written SQL component based on the conversion information for the selected SQL implementation, and
wherein if the conversion information does not exist then the SQL code of the custom-written SQL component is not modified based on the selection of one or more of the plurality of SQL implementations that are different from the particular implementation of SQL associated with the SQL code of the custom-written SQL component;
loading the source data onto a target database; and
executing the generated SQL code on the source data loaded on the target database, wherein the rendering, generating, loading and executing are performed by one or more processors.

22. The method of claim 21 wherein the rendering comprises:
rendering the visual representation of the DTM including a first selected component in association with the generated SQL code corresponding to the first selected component.

23. The method of claim 22 further comprising:
receiving modifications, by the user, to the generated SQL code corresponding to the first selected component; and
executing the SQL code including the modifications.

24. A computer program product comprising instructions, stored on a non-transitory tangible medium, that when executed by one or more processors, cause the computer program product to perform operations comprising:

receiving a first selection of a plurality of components to include in a visual representation of a data transformation model (DTM) for extracting data from a source database and transforming and loading the data on a target database based on the DTM, wherein the components include at least one custom-written SQL component including SQL code specific to a particular implementation of SQL;

receiving a second selection of one or more of a plurality of different implementations of SQL (structured query language) associated with at least one or more of the source database and the target database for which to generate code, wherein the different implementations of SQL comprise at least one or more SQL code features specific to each implementation, and wherein the plurality of components in the visual representation of the DTM are compatible with each of the plurality of SQL implementations and wherein the generated SQL code, when executed, performs one or more data transformation on data of the associated database;

providing, responsive to a first component of the first selection, SQL code corresponding to the SQL implementation of the second selection;

generating an SQL script configured to transform the data extracted from the source database for loading onto the target database based on the DTM, wherein the SQL script comprises the SQL code for each of the plurality of components; and determining if the custom-written SQL component includes conversion information for one of the selected plurality of SQL implementations different from the particular implementation of SQL associated with the SQL code of the custom-written SQL component, wherein if the conversion information exists then converting the SQL code of the custom-written SQL component based on the conversion information for the selected SQL implementation, and wherein if the conversion information does not exist then the SQL code of the custom-written SQL component is not modified based on the selection of one or more of the plurality of SQL implementations that are different from the particular implementation of SQL associated with the SQL code of the custom-written SQL component.

* * * * *